(12) United States Patent
Alm (10) Patent No.: US 10,197,039 B2
(45) Date of Patent: Feb. 5, 2019

(54) WAVE ENERGY CONVERTER COMPRISING A PISTON ROD WITH A FLOAT BODY

(71) Applicant: W4P WAVES4POWER AB, Västra Frölunda (SE)

(72) Inventor: Filip Alm, Bohus (SE)

(73) Assignee: WAP Waves4Power AB, Vastra Frolunda (SE)

( * ) Notice: Subject to any disclaimer, the term of this patent is extended or adjusted under 35 U.S.C. 154(b) by 0 days.

(21) Appl. No.: 15/751,691

(22) PCT Filed: Jul. 30, 2016

(86) PCT No.: PCT/SE2016/000041
§ 371 (c)(1),
(2) Date: Feb. 9, 2018

(87) PCT Pub. No.: WO2017/026934
PCT Pub. Date: Feb. 16, 2017

(65) Prior Publication Data
US 2018/0238294 A1  Aug. 23, 2018

(30) Foreign Application Priority Data
Aug. 10, 2015  (SE) ........................ 1530115

(51) Int. Cl.
*F03B 13/18* (2006.01)
*F03B 13/20* (2006.01)
*B63B 35/44* (2006.01)

(52) U.S. Cl.
CPC ............ *F03B 13/187* (2013.01); *F03B 13/20* (2013.01); *B63B 35/4406* (2013.01);
(Continued)

(58) Field of Classification Search
CPC .... F03B 13/187; F03B 13/20; B63B 35/4406; B63B 2035/4466; F05B 2240/131
See application file for complete search history.

(56) References Cited

U.S. PATENT DOCUMENTS

| 4,076,463 | A | * | 2/1978 | Welczer | ................ | F03B 13/187 |
| | | | | | | 417/331 |
| 4,326,840 | A | * | 4/1982 | Hicks | ..................... | B01D 61/10 |
| | | | | | | 417/331 |

(Continued)

FOREIGN PATENT DOCUMENTS

WO  2009/078735 A1  6/2009

OTHER PUBLICATIONS

International Search Report, dated Nov. 22, 2016, from corresponding PCT/SE2016/000041 application.

*Primary Examiner* — Benjamin F Fiorello
(74) *Attorney, Agent, or Firm* — Young & Thompson (57) ABSTRACT

A wave energy converter includes a buoyant body and an acceleration tube with a working cylinder and working piston movable therein, a mooring system, and at least one energy collecting device including a hydraulic pump in the form of a hydraulic cylinder having a jacket and an internal pump piston connected to at least one piston rod, which forms a mechanical connection between the buoyant body and the working piston in the working cylinder, wherein at least one float body having a buoyancy in the body of water where the wave energy converter operates is connected to the working piston and wherein the buoyancy of the float body is adapted to maintain the working piston in a desired vertical operating range in the working cylinder when the wave energy converter.

20 Claims, 3 Drawing Sheets

(52) U.S. Cl.
CPC . *B63B 2035/4466* (2013.01); *F05B 2240/131* (2013.01); *Y02E 10/38* (2013.01)

(56) References Cited

U.S. PATENT DOCUMENTS

| | | | | |
|---|---|---|---|---|
| 4,698,969 | A | * 10/1987 | Raichlen | F03B 13/187 210/121 |
| 4,773,221 | A | 9/1988 | Noren | |
| 6,140,712 | A | * 10/2000 | Fredriksson | F03B 13/1855 290/53 |
| 6,226,989 | B1 | 5/2001 | Fredriksson et al. | |
| 6,731,019 | B2 | * 5/2004 | Burns | F03B 13/148 290/42 |
| 6,768,216 | B1 | * 7/2004 | Carroll | F03B 13/148 290/42 |
| 7,076,949 | B2 | * 7/2006 | Fernandez Gomez | F03B 13/1855 60/498 |
| 7,909,536 | B2 | * 3/2011 | Dick | B63B 35/44 405/76 |
| 2008/0012344 | A1 | * 1/2008 | Buffard | F03B 13/187 290/53 |
| 2009/0250934 | A1 | * 10/2009 | Bozano | F03B 13/145 290/53 |
| 2010/0034588 | A1 | 2/2010 | Dick | |

* cited by examiner

WAVE ENERGY CONVERTER COMPRISING A PISTON ROD WITH A FLOAT BODY

TECHNICAL FIELD

The present invention relates to a wave energy converter comprising a buoyant body, an acceleration tube dependent from and attached to the buoyant body and defining a working cylinder between an upper and a lower end thereof, upper and lower openings in the acceleration tube, a working piston reciprocable in the working cylinder, an energy conversion assembly comprising at least one energy collecting device collecting energy from the movements of the working piston relative to the buoyant body resulting from wave movements, and a mooring system adapted to maintain the wave energy converter within a desired anchoring area.

BACKGROUND OF THE INVENTION

Wave movements in oceans and large lakes constitute an important source of energy which can be utilized by harvesting energy from the waves by means of wave power assemblies, also called wave energy converters, which are positioned or anchored at locations with suitable wave conditions.

A number of different types of wave energy converters for harvesting and converting wave energy into electrical power are previously known. One previously known type of wave energy converter is based on relative movement between, on the one hand, a buoyant body and a thereto attached so-called acceleration tube, and, on the other hand, a working piston reciprocable in the acceleration tube, wherein the relative movement is caused by wave movements in the body of water where the wave energy converter is anchored by means of one or several mooring lines for harvesting wave energy. The movement of the working piston can be used for driving, for example, a pump assembly, such as a double acting hydraulic pump or a hose pump, a hydraulic motor and/or a hydraulic turbine of an energy conversion system, which is disposed inside or adjacent to the buoyant body for producing electricity which can be transferred to an energy storage or electrical grid.

A problem that may arise with previously known wave energy converters having an acceleration tube with a working cylinder and a working piston reciprocable in the working cylinder is that the working piston gradually shifts away from its optimum operating range in the working cylinder, so that the mean vertical position of the working piston is no longer centered at the middle of the working cylinder, as viewed in the longitudinal direction thereof, but is displaced downward or upward in the acceleration tube. Such a shift or displacement of the operating range of the working piston may lead to a decreased efficiency of the wave energy converter and also cause other operational disturbances, which is of course not desirable.

Another problem with previously known wave energy converters having an acceleration tube and a hydraulic pump driven by the reciprocating movement of the working piston relative to the acceleration tube has turned out to be that a growth of barnacles and other marine organisms can appear if a piston rod of the hydraulic pump remains extended and exposed to water for a longer period of time when the wave energy converter is not operating, e.g. during light winds or other operational interruptions. Such growth of e.g. barnacles on a piston rod is undesired, since the growth may lead to operational disturbances in the wave energy converter and furthermore is difficult and time-consuming to remove.

A further problem with previously known wave energy converters having an acceleration tube and a hydraulic pump driven by the reciprocating movement of the working piston relative to the acceleration tube is that the hydraulic pump and its associated hydraulic system may give rise to a risk of leakage of hydraulic fluid to the body of water in which the wave energy converter is placed, both in the event of breakdowns and in connection with servicing or replacement of different components of the hydraulic pump and/or the hydraulic system. Such leakage of hydraulic fluid is of course not desired.

Additional problems solved by the present invention will become evident from the following description.

SUMMARY OF THE INVENTION

A first object of the present invention is to provide a wave energy converter having an acceleration tube where the risk that the operating range of the reciprocating working piston in the acceleration tube is displaced gradually from its optimum position has been reduced considerably.

This first object is achieved by means of a wave energy converter according to claim 1, which comprises a buoyant body, an acceleration tube dependent from and attached to the buoyant body and having an upper end adjacent to the buoyant body and a lower end at a distance from the buoyant body, wherein a portion of the acceleration tube defines a working cylinder between the upper end and the lower end, upper and lower openings in the acceleration tube for allowing a substantially unimpeded flow of water between the working cylinder and a body of water in which the acceleration tube is at least partially submerged when the wave energy converter operates as a result of wave movements, a working piston reciprocable in the working cylinder, an energy conversion assembly comprising at least one energy collecting device collecting energy from the movements of the working piston relative to the buoyant body resulting from said wave movements, and a mooring system adapted to maintain the wave energy converter within a desired anchoring area and comprising at least one fastening device mounted on the wave energy converter for attachment of a mooring line to the wave energy converter, wherein the energy collecting device comprises a hydraulic pump in the form of a hydraulic cylinder having a jacket and an internal pump piston connected to at least one piston rod, which forms a mechanical connection between the buoyant body and the working piston in the working cylinder, wherein at least one float body having a buoyancy in the body of water where the wave energy converter operates is connected to the working piston, and wherein the buoyancy of the float body is adapted to maintain the working piston in a desired vertical operating range in the working cylinder when the wave energy converter operates.

By providing such a float body, preferably on a piston rod below or adjacent to the pump piston of the hydraulic pump, the advantage is achieved that the mean vertical position of the working piston in the acceleration tube is caused to be related to and will be controlled by the mean level of the water surface of the body of water in which the acceleration tube is at least partially submerged, which efficiently prevents the operating range of the working piston from shifting or being displaced from the optimum position in the acceleration tube.

A second object of the present invention is to provide a wave energy converter having an acceleration tube and a hydraulic pump where the risk of growth of barnacles and other marine organisms on a piston rod of the hydraulic pump has been reduced considerably.

This second object is achieved by means of a wave energy converter according to claim 4, in which the hydraulic cylinder of the hydraulic pump exhibits a piston rod connected to the internal pump piston which is intended to reciprocate between a position partially retracted into and protected inside the hydraulic cylinder and a position partially extended out of and exposed from the hydraulic cylinder, respectively, via an opening with encircling sealing means, when the wave energy converter operates, and wherein the piston rod connected to the internal pump piston, in the partially extended and exposed position, is adapted to exhibit an exposed portion which, during normal conditions, is positioned above the mean water level of the body of water in which the acceleration tube is at least partially submerged.

Since the piston rod of the hydraulic cylinder, at least during light winds or wind-still and relatively small wave movements in the body of water, will exhibit an exposed portion that is positioned above the water surface when the piston rod is in the partially extended and exposed position, the life conditions for growth of barnacles and other marine organisms on the exposed piston rod will get worse and the risk of growth of such marine organisms will be reduced considerably.

A third object of the present invention is to provide a wave energy converter having an acceleration tube and a hydraulic pump in which any leakage of hydraulic fluid from the hydraulic system associated with the hydraulic cylinder of the hydraulic pump can be monitored continuously, and the risk of leakage of hydraulic fluid from the hydraulic system during operation can be reduced considerably.

This third object is achieved by means of a wave energy converter according to claim 5, in which the hydraulic system associated with the hydraulic cylinder is primarily housed in a pressurized volume contained within or constituting a removable cassette, which is mounted in the buoyant body or the acceleration tube.

Since the hydraulic system associated with the hydraulic system is primarily housed in a pressurized volume contained within or constituting the cassette, any leakage of hydraulic fluid from the hydraulic system can be collected in the cassette, and a possibly occurring leakage can be detected by in-line pressure measurement, which makes it possible to stop the operation of the hydraulic system immediately when detecting a pressure drop, which reduces the risk of leakage of hydraulic fluid from the hydraulic system during operation. Furthermore, since measures for checking and, if necessary, repairing the hydraulic system can be undertaken without any unnecessary delay, the risk of any major hydraulic fluid spills occurring is minimized.

Further objects and advantages of the invention, and the features enabling these objects and advantages to be achieved, will become evident from the following description.

BRIEF DESCRIPTION OF THE DRAWINGS

In the following, the invention will be described by means of a number of different embodiments with reference to the accompanying drawings, in which.

DESCRIPTION OF EMBODIMENTS OF THE INVENTION

Figure 1:
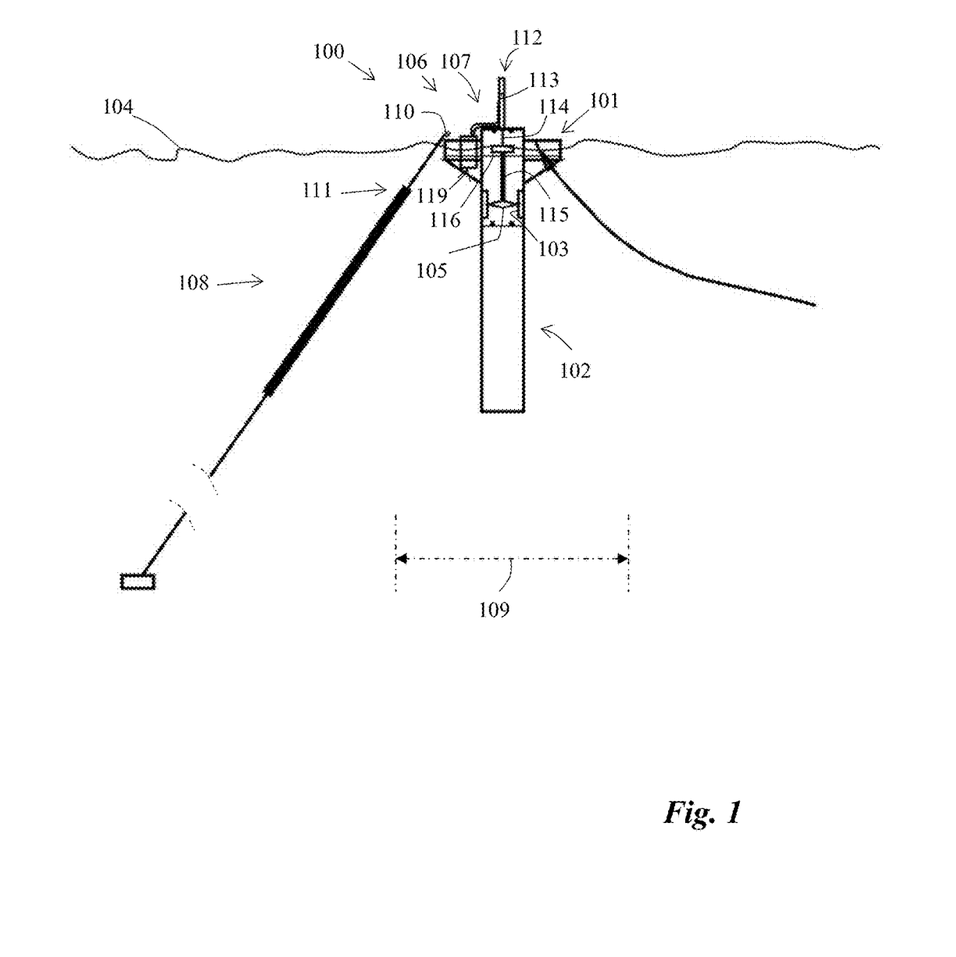
FIG. 1 is a schematic side view, partially in cross-section, of a wave energy converter according to one embodiment of the invention, which is maintained within a desired anchoring area by a mooring system, while the wave energy converter operates as a result of wave movements in a body of water in which the acceleration tube of the wave energy converter is at least partially submerged.
Figure 2:
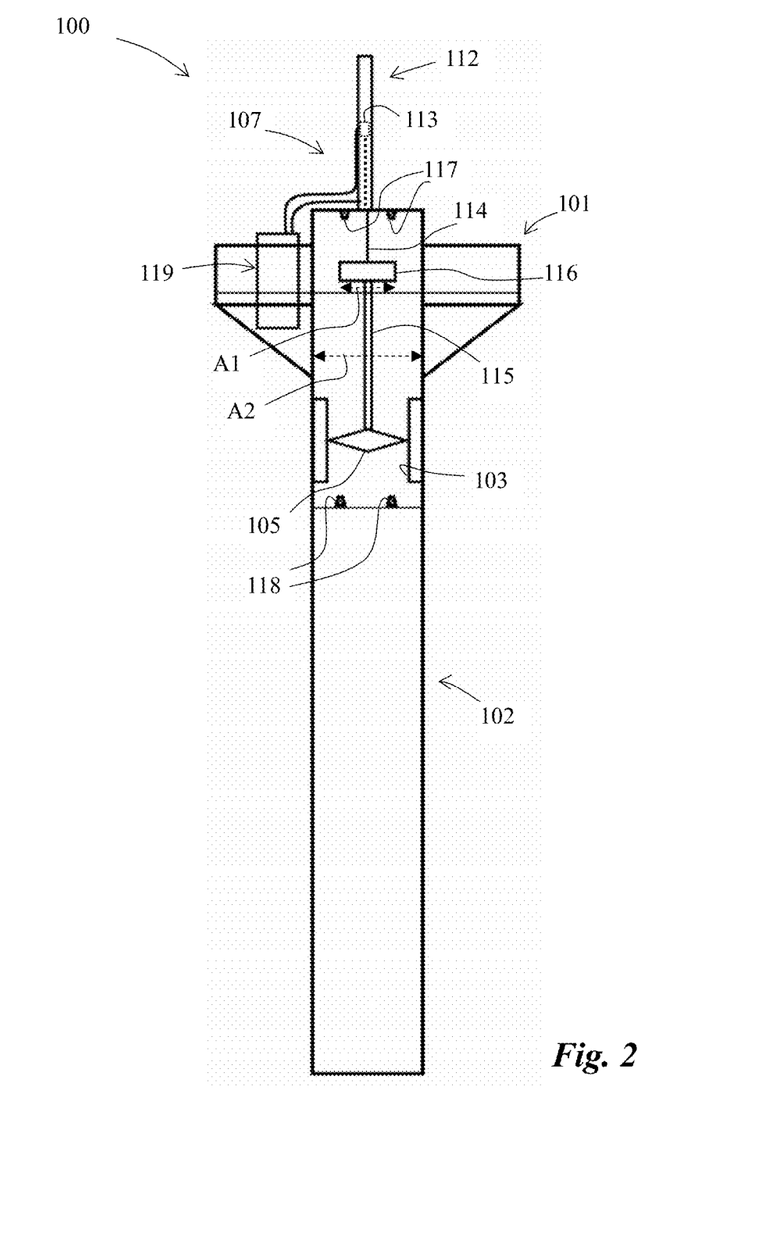
FIG. 2 is an enlarged schematic view illustrating how the energy conversion assembly is disposed relative to the buoyant body and the acceleration tube of the wave energy converter in FIG. 1.

In the following, a number of embodiments of a wave energy converter according to the invention will be described in greater detail with reference to the accompanying FIGS. 1-3.

The wave energy converter 100; 200 comprises a buoyant body 101; 102, which can be of any type and design suitable for the purpose. An acceleration tube 102; 202 is dependent from and attached to the buoyant body 101; 201 and has an upper end adjacent to the buoyant body and a lower end at a distance from the buoyant body, wherein a portion of the acceleration tube 102; 202 defines a working cylinder 103; 203 between the upper end and the lower end. Wave energy converters with acceleration tubes are well known to a skilled person in the field, for example from the patent publications SE 508 307 and SE 508 308. Upper and lower openings in the acceleration tube 102; 202 allow a substantially unimpeded flow of water between the working cylinder 103; 203 and a body of water 104 in which the acceleration tube 102; 202 is at least partially submerged when the wave energy converter operates as a result of wave movements. In the working cylinder 103; 203, there is disposed a working piston 105; 205, which is reciprocable in the working cylinder 103; 203.

The upper and lower openings in the acceleration tube 102; 202 can be provided in different ways depending on the embodiment. In one advantageous embodiment of the wave energy converter 100; 200, an upper opening is provided in the form of the open end at the top of the acceleration tube 102; 202, which opens into the atmosphere above the top side of the buoyant body, while a lower opening is provided in the form of the open end at the bottom of the acceleration tube 102; 202, which preferably opens approximately 20 meters below the water surface into the body of water in which the acceleration tube 102; 202 is partially submerged. However, it is also conceivable with embodiments of the invention where one or both of the upper and lower openings, respectively, are provided in the form of one or several suitably dimensioned holes disposed through the envelope surface of the acceleration tube at suitable positions.

It is advantageous that the wave energy converter 100 according to the invention further comprises an arrangement for so-called peak force relief to reduce the risk of the working piston 105, the energy collecting device 107, or other components of the wave energy converter 100 being damaged by the forces from excessively large wave movements. As indicated in FIG. 1, such an arrangement can advantageously be provided in that the working cylinder 103 is disposed inside the acceleration tube 102 and designed with a shorter length and smaller inner diameter than the acceleration tube 102 and that the working piston 105 is designed with an outer diameter fitting inside the inner diameter of the working cylinder 103 and adapted to have a maximum length of stroke that is longer than the length of the working cylinder 103 and shorter than the length of the acceleration tube 102. In order to achieve a smaller material consumption and a more simple manufacture, the working cylinder can, in one advantageous embodiment of the invention, also be given a smaller outer diameter than the inner diameter of the acceleration tube.

In embodiments where the wave energy converter 100 is provided with a suitably designed and dimensioned arrangement for peak force relief as described above, an excessively large wave crest or wave trough passing the wave energy converter 100 will cause the working piston 105 to be pushed to an extreme position outside the working cylinder 103, so that an open passage for the falling or rising water column inside the acceleration tube 102 is formed between the smaller outer diameter of the working piston 105 and the larger inner diameter of the acceleration tube 102 outside the working cylinder 103 and is kept open to let water through until the excessively large wave crest or wave trough has passed.

The wave energy converter 100 further comprises a mooring system 108 adapted to maintain the wave energy converter 100 within a desired anchoring area 109 and comprising at least one fastening device 110 mounted on the wave energy converter 100 for attachment of a mooring line 111 to the wave energy converter 100.

Accordingly, the mooring system of the wave energy converter according to the invention can comprise one or several mooring lines, but preferably comprises at least two mooring lines, out of which at least one, and preferably all, is/are provided with at least one elastic portion or at least one buoyant element, which after pretensioning of the line/lines is capable of keeping it/them taut even when large waves are passing the buoyant body. Similarly, the mooring system of the wave energy converter according to the invention can comprise one or several fastening devices for attachment of the mooring line/lines, but preferably comprises at least two fastening devices, out of which at least one, and preferably all, comprises/comprise a winch or a rotationally fixed winding device mounted on the buoyant body, allowing a very careful and almost slip-free attachment of the upper end of a mooring line to the buoyant body.

The wave energy converter 100 according to the invention further comprises an energy conversion assembly 106 comprising at least one energy collecting device 107; 207 collecting energy from the movements of the working piston 105; 205 relative to the buoyant body 101; 201 resulting from said wave movements.

The energy collecting device 107; 207 of the wave energy converter according to the invention includes a hydraulic pump in the form of a hydraulic cylinder 112; 212 having an internal pump piston 113; 213 connected to at least one hydraulic piston rod 114, 115; 215, 220. One of the main parts of the hydraulic cylinder, i.e. cylinder jacket or piston rod, is mechanically connected to the working piston 105; 205, while the other one is connected to the buoyant body 101; 201 of the wave energy converter. In one embodiment, illustrated in FIGS. 1 and 2, the piston rod can comprise two piston rod parts, one piston rod part 114 which reciprocates into and out of the hydraulic cylinder 112 and is attached to the pump piston 113, and another piston rod part 115 which is attached to the working piston 105. In another embodiment, illustrated in FIG. 3, the hydraulic cylinder 212 is provided with a hydraulic piston rod 220 which extends upwardly from the hydraulic cylinder 212 (when the buoyant body 201 is in its normal floating position) and is mechanically connected to the buoyant body 201. In such an embodiment, the cylinder jacket of the hydraulic cylinder 212 is instead mechanically connected to the working piston 205. In both the above-mentioned embodiments, the working piston 105; 205 is normally disposed vertically below the pump piston 113; 213, i.e. the hydraulic cylinder 112; 212 is disposed at a higher level in the wave energy converter 100; 200 than the working piston 105; 205 inside the acceleration tube 102; 202.

In the wave energy converter 100; 200 according to the invention, at least one float body 116; 216 having a buoyancy in the body of water where the wave energy converter 100; 200 operates is connected to the working piston 105; 205 and preferably disposed on the at least one piston rod 114, 115; 215 below or adjacent to the pump piston 113; 213. In the embodiment illustrated in FIGS. 1 and 2, the float body 116 is disposed below the pump piston 113 at the end of the piston rod 114 of the hydraulic cylinder 112. In this embodiment, the float body 116 typically floats with approximately half a meter of the body above and approximately half a meter of the body below the mean water level in the acceleration tube 102. In the embodiment illustrated in FIG. 3, the float body 216 is integrated with a cassette/pressure container as will be described in greater detail below. In the embodiment according to FIG. 3, the upwardly directed piston rod of the hydraulic cylinder 212 will reach approx. 1 meter below the mean water surface in the acceleration tube, that is to say, the pump piston 213 is positioned less than half the piston rod length below the mean water surface. In the embodiment according to FIG. 3, the entire hydraulic system is integrated into the float body 216, which therefore must have a greater volume to be capable of supporting the greater weight. Therefore, in the embodiment according to FIG. 3, the float body 216 floating at the mean water surface will typically extend from approx. 1 meter above the water surface to approximately 3 meters below the mean water surface. The mean water surface, or still water level, refers to the level at which the water surface would be during calm weather without waves. During such conditions, both the buoyant body 101; 201 of the wave energy converter and the float body 116; 216 will float with their respective design water lines at the level of the water surface outside, respectively inside, the acceleration tube 102; 202. The buoyancy of the float body 116; 216 is adapted to maintain the working piston 105; 205 in a desired vertical operating range in the working cylinder 103; 203 when the wave energy converter 100; 200 operates. Owing to the provision of such a float body, with a suitably adapted volume, shape, weight, buoyancy and position on the piston rod, the advantage is achieved that the mean vertical position of the working piston in the acceleration tube is caused to be related to and will be controlled by the mean level of the water surface of the body of water in which the acceleration tube is at least partially submerged. This efficiently prevents the operating range of the working piston from shifting or being displaced from the optimum position in the acceleration tube.

When viewed vertically, the float body 116 preferably has a cross-sectional area A1 that is at least 8%, even more advantageously more than 16%, of an internal cross-sectional area A2 of the acceleration tube 102. Owing to such a dimensioning, the float body obtains a sufficiently large buoyancy to provide a restoring force that ensures that the float body 116 returns to its intended floating position and that the working piston 105 is thereby returned to its intended operating range after a disturbance. Such a disturbance may, for example, consist in that an unusually large wave has displaced the working piston 105 to its extreme position so that water has flowed past the working piston, or that an unusually large wave has crashed into the acceleration tube 102 from above. When the working piston 105 is to be returned to its intended operating range in the working cylinder 103 after such a disturbance, a relatively large force is required to force the water past the narrow gap between the working piston 105 and the inner walls of the working cylinder 103, which means that the float body 116 should be dimensioned to provide a sufficiently large such restoring force.

More specifically, the working piston 105 is always inside its working cylinder 103 during normal operation. During such conditions only a limited amount of water passes through the narrow gap around the working piston 105, which means that the amount of water in the acceleration tube 102 above the working piston 105 is more or less constant. Hence, the float body 116 is always floating in its normal floating position. If the working piston 105 is forced outside of the working cylinder 103, e.g. by a large wave, a larger passage for water past the working piston is opened. The purpose of this is to reduce the force on the working piston and thereby the maximum forces that the wave energy converter has to withstand, which makes it possible to give the wave energy converter a design that is lighter and cheaper. In situations where such a peak force relief occurs, the amount of water in the acceleration tube 102 above the working piston 105 will increase if the working piston is forced out of the working cylinder 103 in an upward direction, and decrease if the working piston 105 is forced out of the working cylinder 103 in a downward direction. Due to the fact that also the water level around the float body 116 changes in such a case, the float body 116 will then apply a force on the working piston 105 keeping it in its extreme position outside the working cylinder 103 until the level of the wave has changed, so that the normal amount of water in the acceleration tube 102 above the working piston 105 has been restored, so that the wave energy converter 100 can start operating normally again. To ensure such a function, the float body 116 should be dimensioned to provide a force that is sufficiently large, so that the working piston 105 does not start moving prematurely due to the force of the passing water on the working piston 105 when it is in its extreme position outside the working cylinder 103. The change in force that the float body 116 gives to the working piston 105 is directly proportional to the water line cross-sectional area of the float body times the change in height of the water level relative to the float body 116. Trials have shown that, if the water line cross-sectional area of the float body 116 is larger than 8% of the area of the working piston 105, the float body (and thereby also the working piston 105) will remain at the desired level in the acceleration tube 102 for a sufficiently long period of time in most cases.

Another situation that may occur is that a wave tumbles over the edge of the buoyant body 101 and into the acceleration tube 102, so that the amount of water in the acceleration tube 102 above the working piston 105 is increased. In such a case the water surface around the float body 116 will rise, so that it exerts a lifting force on the working piston 105. This may occur when the working piston 105 is positioned inside the working cylinder 103. Since the lifting force from the float body 116 is sufficiently large, water is forced through the narrow gap between the water piston and the inner walls of the working cylinder quickly enough to allow the amount of water in the acceleration tube 102 above the working piston 105 to be rapidly restored to its normal level.

In one advantageous embodiment of the wave energy converter 100; 200 according to the invention, upper 117; 217 and lower 118; 218 buffer means, respectively, are disposed inside the acceleration tube 102; 202 so as to limit the maximum vertical stroke of the working piston 105; 205 when the wave energy converter 100; 200 operates. The buffer means 117; 118; 217, 218 are preferably of rubber. It is advantageous if both the upper and lower buffer means, respectively, are acting directly on the working piston (not shown in the figures), since the forces trying to displace the working piston originate from the water movement in the acceleration tube and are acting on the working piston. The force paths will then be shorter and the material consumption can be reduced while maintaining sufficient strength. However, in one embodiment, illustrated in FIG. 3, where the float body 216 is integrated with a removable hydraulic cassette 219, as will be described in greater detail hereinbelow, it is more advantageous if the upper buffer means 217 are acting on the top side of the float body 216, since then it will be easier to unmount the upper buffer means 217 to lift out the entire hydraulic cassette 219 together with the working piston 205. Owing to the provision of such preferably resilient buffer means, e.g. suitably disposed rubber blocks, the risk of damages to the working piston and/or the float body in case of excessively large wave movements is minimized.

In another advantageous embodiment of the wave energy converter 100; 200 according to the invention, the hydraulic cylinder 112; 212 exhibits a piston rod 114; 220 connected to the internal pump piston 113; 213 which reciprocates, or is displaced, relative to the jacket of the hydraulic cylinder, via an opening with encircling sealing means (not shown in the figures), between a position partially retracted into and protected inside the hydraulic cylinder 112; 212 and a position partially extended out of and exposed from the hydraulic cylinder 112; 212 when the wave energy converter 100; 200 operates, wherein the piston rod 114; 220 connected to the internal pump piston, in the partially extended and exposed position, is adapted to exhibit an exposed portion which, during normal conditions, is positioned above the mean water level of the body of water in which the acceleration tube 102; 202 is at least partially submerged. Owing to the fact that the piston rod 114; 220 connected to the internal pump piston 113; 213, in the partially extended and exposed position, is adapted to be positioned above the mean water level during normal conditions, the risk of growth of barnacles and other marine organisms on a piston rod of the hydraulic pump is reduced considerably, which reduces operational disturbances and operational shutdowns for cleaning operations.

In a preferred embodiment of the wave energy converter 100; 200 according to the invention, the hydraulic system associated with the hydraulic cylinder 112; 212 is primarily housed in a pressurized volume contained within or constituting a removable cassette 119; 219, which is mounted in the buoyant body 101 or the acceleration tube 202 when the wave energy converter 100; 200 operates. The hydraulic system associated with the hydraulic cylinder 112; 212 preferably comprises at least hydraulic fluid conduits for connecting at least one pumping chamber of the hydraulic cylinder to a hydraulic pressure accumulator and further to a hydraulic motor in driving connection with a generator (not shown in the figures) during operation of the wave energy converter, wherein at least the hydraulic motor and the generator are housed in the pressurized volume. This eliminates the need for a seal for a rotating shaft. Namely, it is the fact that the internal part of the hydraulic motor is normally set at the same pressure as the pressurized volume. If in that case everything connected to the rotating shaft of the hydraulic motor is housed in the pressurized volume, there is no need for this shaft seal. It is particularly advantageous if also other hydraulic components, such as valve blocks, the pressure accumulator and any filters, are all housed in the removable cassette 119; 219, which is provided with at least one lead-through means for electrical current fed to or produced by the wave energy converter 100; 200.

Owing to the fact that the hydraulic system associated with the hydraulic cylinder is primarily housed in a pressurized volume contained within or constituting the cassette, any leakage of hydraulic fluid from the hydraulic system can be collected in the cassette, and a possibly occurring leakage can be detected by in-line pressure measurement during operation of the wave energy converter, which makes it possible to stop the operation of the hydraulic system immediately when detecting a pressure drop in the pressurized volume inside the cassette. Alternatively, or in addition, the piston rod seals of the hydraulic cylinder 112; 212 can be provided with an additional seal outside the conventional fluid seal (not shown in the figures) with a weep space therebetween. By checking whether hydraulic fluid has leaked out into the weep space, an indication that the piston rod seal is getting worn is obtained before fluid has time to leak out to the environment. Thanks to such a cassette design, the risk of leakage of hydraulic fluid from the hydraulic system during operation is reduced, and because measures for checking and, if necessary, repairing the hydraulic system can be undertaken without any unnecessary delay, the risk of any major hydraulic fluid spills occurring in the body of water where the wave energy converter operates is minimized.

Figure 3:
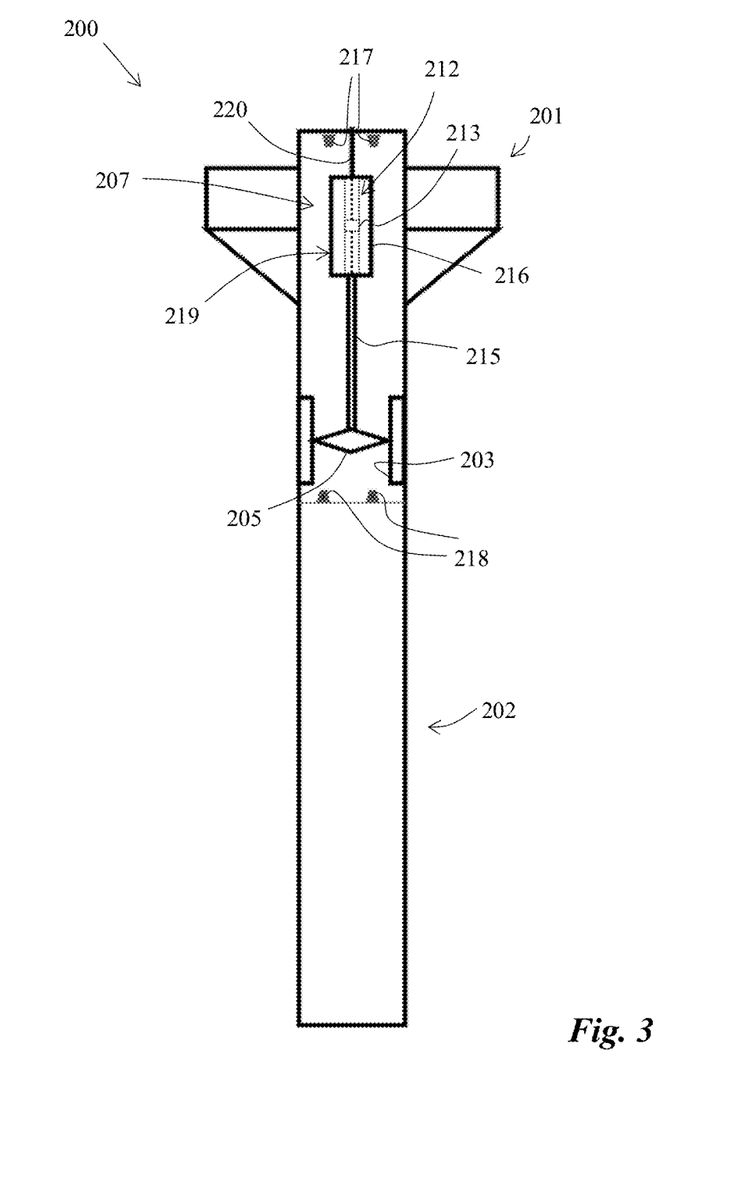
FIG. 3 is an enlarged schematic view illustrating how the energy conversion assembly is disposed relative to the buoyant body and the acceleration tube of a wave energy converter according to a particularly preferred embodiment of the invention.

In a particularly preferred embodiment of the invention, illustrated in FIG. 3, the hydraulic cylinder 212 is also housed in the removable cassette 219. By arranging also the hydraulic cylinder 212 inside the removable cassette, an integrated energy collecting and energy converting unit can be obtained in which the hydraulic pump and the entire hydraulic system associated therewith, and preferably also the hydraulic motor and the generator, are enclosed, which minimizes the risk of leakage of hydraulic fluid and also facilitates servicing in case of a possible malfunction of the components inside the cassette, since the faulty cassette has a design which makes it easy to dismount and replace it with a new faultless cassette. The faulty cassette can then be investigated and repaired in a workshop, which is much simpler and more reliable than to make the repair on site.

In one advantageous embodiment of the invention, illustrated in FIG. 3, a fluid tank 219 for hydraulic fluid of the hydraulic system associated with the hydraulic cylinder 212 is designed to constitute the removable cassette. By having the fluid tank 219 itself constituting the casing of the removable cassette, it can be made lighter and more compact. Furthermore, the fluid conduits of the hydraulic system can be made shorter so that a lower pressure drop is achieved, allowing no need for positive pressure in the cassette. However, it is advantageous to have a positive pressure in the cassette, since a decrease of the pressure will immediately indicate that a leak has formed in the hydraulic system, so that measures can be undertaken in good time before any hydraulic fluid has time to leak out to the environment. The pressure in the cassette can advantageously be kept lower than 0.5 bars, so that the cassette does not need to be certified as a pressure vessel.

In another advantageous embodiment of the invention, the removable cassette 219 is integrated with, or by itself constitutes the float body 216, as illustrated in FIG. 3. In such an embodiment, the hydraulic cylinder 212 is preferably disposed in the removable cassette 219 so that the exposed portion of the piston rod 220 is positioned above the mean water level, i.e. above the design water line, in the acceleration tube 202. Such a design reduces the number of necessary components of the wave energy converter 200 and thereby gives a lower weight and lower manufacturing costs and, in addition, allows shorter conduits and thus a lower pressure drop in the hydraulic conduits. In this embodiment, it is particularly advantageous to have the pressurized volume constitute the cassette and to arrange an additional piston rod seal outside the conventional fluid seal.

In still another advantageous embodiment, the removable cassette 219 is adapted to be cooled by water moving around the buoyant body and/or in the acceleration tube 202 when the wave energy converter 200 operates. This embodiment is advantageous since it eliminates the need for a cooling water pump and cooling water conduits for removing excess heat from the cassette. Such water cooling can be achieved in a very simple and advantageous way when the hydraulic cassette 219 is integrated with the float body 216 and disposed inside the acceleration tube 202.

In other embodiments (not shown in the figures), water cooling can also be achieved with the hydraulic cassette disposed inside the buoyant body itself. In such cases, it can be ensured that water from the body of water where the wave energy converter operates gets in direct contact with the hydraulic cassette using a suitable arrangement, or the cassette can be placed submerged in a water-filled space in the buoyant body that communicates thermally with the body of water outside, e.g. in that the water in the water-filled space is in direct contact with the inside of the hull plates of the buoyant body.

In the foregoing, the present invention has been described with the aid of a number of different embodiments and with reference to the accompanying drawings. It should be understood, however, that the invention is not limited to the described embodiments and to what is shown in drawings, but that also other embodiments are conceivable within the scope of the invention as it is defined by the following claims.

The invention claimed is:

1. A wave energy converter (100; 200), comprising a buoyant body (101; 201), an acceleration tube (102; 202) dependent from and attached to the buoyant body (101; 201) and having an upper end adjacent to the buoyant body and a lower end at a distance from the buoyant body, wherein a portion of the acceleration tube (102; 202) defines a working cylinder (103; 203) between the upper end and the lower end, upper and lower openings in the acceleration tube (102; 202) for allowing a substantially unimpeded flow of water between the working cylinder (103; 203) and a body of water (104) in which the acceleration tube (102; 202) is at least partially submerged when the wave energy converter operates as a result of wave movements, a working piston (105; 205) reciprocable in the working cylinder (103; 203), an energy conversion assembly (106) comprising at least one energy collecting device (107; 207) collecting energy from the movements of the working piston (105; 205) relative to the buoyant body (101; 201) resulting from said wave movements, and a mooring system (108) adapted to maintain the wave energy converter (100) within a desired anchoring area (109) and comprising at least one fastening device (110) mounted on the wave energy converter (100) for attachment of a mooring line (111) to the wave energy converter (100), wherein the energy collecting device (107; 207) comprises a hydraulic pump in the form of a hydraulic cylinder (112; 212) having a jacket and an internal pump piston (113; 213) connected to at least one piston rod (114, 115; 215, 220), which forms a mechanical connection between the buoyant body (101; 201) and the working piston (105; 205) in the working cylinder (103; 203), that at least one float body (116; 216) having a buoyancy in the body of water where the wave energy converter (100; 200) operates is connected to the working piston (105; 205), and that the buoyancy of the float body (116; 216) is adapted to maintain the working piston (105; 205) in a desired vertical operating range in the working cylinder (103; 203) when the wave energy converter (100; 200) operates.

2. The wave energy converter according to claim 1, wherein the float body (116), when viewed vertically, has a cross-sectional area (A1) that is at least 8%, even more advantageously more than 16%, of an internal cross-sectional area (A2) of the acceleration tube (102).

3. The wave energy converter according to claim 2, wherein upper (117; 217) and lower (118; 218) buffer means, respectively, are disposed inside the acceleration tube (102; 202) so as to limit the maximum vertical stroke of the working piston (105; 205) when the wave energy converter (100; 200) operates, wherein said lower buffer means (118; 218) are acting on the working piston (105; 205).

4. The wave energy converter according to claim 2, wherein the hydraulic cylinder (112; 212) exhibits a piston rod (114; 220) connected to the internal pump piston (113; 213), which is intended to reciprocate between a position partially retracted into and protected inside the hydraulic cylinder (112; 212) and a position partially extended out of and exposed from the hydraulic cylinder (112; 212), via an opening with encircling sealing means, when the wave energy converter (100; 200) operates, and that the piston rod (114; 220) connected to the internal pump piston, in the partially extended and exposed position, is adapted to exhibit an exposed portion which, during normal conditions, is positioned above the mean water level of the body of water in which the acceleration tube (102; 202) is at least partially submerged.

5. The wave energy converter according to claim 2, wherein the hydraulic system associated with the hydraulic cylinder (112; 212) is primarily housed in a pressurized volume contained within or constituting a removable cassette (119; 219), which is mounted in the buoyant body (101) or the acceleration tube (202).

6. The wave energy converter according to claim 1, wherein upper (117; 217) and lower (118; 218) buffer means, respectively, are disposed inside the acceleration tube (102; 202) so as to limit the maximum vertical stroke of the working piston (105; 205) when the wave energy converter (100; 200) operates, wherein said lower buffer means (118; 218) are acting on the working piston (105; 205).

7. The wave energy converter according to claim 6, wherein the hydraulic cylinder (112; 212) exhibits a piston rod (114; 220) connected to the internal pump piston (113; 213), which is intended to reciprocate between a position partially retracted into and protected inside the hydraulic cylinder (112; 212) and a position partially extended out of and exposed from the hydraulic cylinder (112; 212), via an opening with encircling sealing means, when the wave energy converter (100; 200) operates, and that the piston rod (114; 220) connected to the internal pump piston, in the partially extended and exposed position, is adapted to exhibit an exposed portion which, during normal conditions, is positioned above the mean water level of the body of water in which the acceleration tube (102; 202) is at least partially submerged.

8. The wave energy converter according to claim 6, wherein the hydraulic system associated with the hydraulic cylinder (112; 212) is primarily housed in a pressurized volume contained within or constituting a removable cassette (119; 219), which is mounted in the buoyant body (101) or the acceleration tube (202).

9. The wave energy converter according to claim 1, wherein the hydraulic cylinder (112; 212) exhibits a piston rod (114; 220) connected to the internal pump piston (113; 213), which is intended to reciprocate between a position partially retracted into and protected inside the hydraulic cylinder (112; 212) and a position partially extended out of and exposed from the hydraulic cylinder (112; 212), via an opening with encircling sealing means, when the wave energy converter (100; 200) operates, and that the piston rod (114; 220) connected to the internal pump piston, in the partially extended and exposed position, is adapted to exhibit an exposed portion which, during normal conditions, is positioned above the mean water level of the body of water in which the acceleration tube (102; 202) is at least partially submerged.

10. The wave energy converter according to claim 9, wherein the hydraulic system associated with the hydraulic cylinder (112; 212) is primarily housed in a pressurized volume contained within or constituting a removable cassette (119; 219), which is mounted in the buoyant body (101) or the acceleration tube (202).

11. The wave energy converter according to claim 1, wherein the hydraulic system associated with the hydraulic cylinder (112; 212) is primarily housed in a pressurized volume contained within or constituting a removable cassette (119; 219), which is mounted in the buoyant body (101) or the acceleration tube (202).

12. The wave energy converter according to claim 11, wherein the hydraulic system associated with the hydraulic cylinder (112; 212) comprises at least hydraulic fluid conduits for connecting at least one pumping chamber of the hydraulic cylinder to a hydraulic pressure accumulator and further to a hydraulic motor in driving connection with a generator when operating the wave energy converter, and that the pressure accumulator, the hydraulic motor and the generator are all housed in the removable cassette (119; 219), which is provided with at least one lead-through means for electrical current fed to or produced by the wave energy converter (100; 200).

13. The wave energy converter according to claim 12, wherein the hydraulic cylinder (212) is also housed in the removable cassette (219).

14. The wave energy converter according to claim 12, wherein the hydraulic system associated with the hydraulic cylinder (212) comprises a fluid tank (219) for hydraulic fluid, which constitutes the removable cassette.

15. The wave energy converter according to claim 11, wherein the hydraulic cylinder (212) is also housed in the removable cassette (219).

16. The wave energy converter according to claim 15, wherein the hydraulic system associated with the hydraulic cylinder (212) comprises a fluid tank (219) for hydraulic fluid, which constitutes the removable cassette.

17. The wave energy converter according to claim 11, wherein the hydraulic system associated with the hydraulic cylinder (212) comprises a fluid tank (219) for hydraulic fluid, which constitutes the removable cassette.

18. The wave energy converter according to claim 11, wherein the removable cassette (219) is integrated with, or by itself constitutes the float body (216).

19. The wave energy converter according to claim 11, wherein the removable cassette (219) is adapted to be cooled by water moving around the buoyant body and/or in the acceleration tube (202) when the wave energy converter (200) operates.

20. The wave energy converter according to claim 1, wherein the working cylinder has a smaller outer diameter than the inner diameter of the acceleration tube.

\* \* \* \* \*